US012657306B2

(12) United States Patent
Bhatia et al.

(10) Patent No.: US 12,657,306 B2
(45) Date of Patent: Jun. 16, 2026

(54) BMC BASED HROT IMPLEMENTATION ESTABLISHING CHAIN OF TRUST IN A SECURED SERVER SYSTEM

(71) Applicant: American Megatrends International, LLC, Duluth, GA (US)

(72) Inventors: Anurag Bhatia, Sugar Hill, GA (US); Winston Thangapandian, Suwanee, GA (US); Valantina Arumugam, Chennai (IN); Sathiyaseelan Lakshminarayanan, Thiruvarur (IN)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 262 days.

(21) Appl. No.: 18/087,098

(22) Filed: Dec. 22, 2022

(65) Prior Publication Data

US 2024/0211602 A1 Jun. 27, 2024

(51) Int. Cl.
| | |
|---|---|
| *G06F 21/57* | (2013.01) |
| *G06F 21/54* | (2013.01) |
| *G06F 21/60* | (2013.01) |

(52) U.S. Cl.
CPC ............ *G06F 21/575* (2013.01); *G06F 21/54* (2013.01); *G06F 21/602* (2013.01)

(58) Field of Classification Search
None
See application file for complete search history.

(56) References Cited

U.S. PATENT DOCUMENTS

| | | | |
|---|---|---|---|
| 11,003,780 B2 | 5/2021 | Liu et al. | |
| 2018/0365422 A1* | 12/2018 | Callaghan | ........... H04L 63/0435 |
| 2019/0073478 A1* | 3/2019 | Khessib | .............. G06F 13/4282 |
| 2020/0257518 A1 | 8/2020 | Liedtke et al. | |

* cited by examiner

*Primary Examiner* — Kevin S Mai

(74) *Attorney, Agent, or Firm* — Tim Tingkang Xia, Esq.; TROUTMAN PEPPER LOCKE LLP

(57) ABSTRACT

In an aspect of the disclosure, a method, a computer-readable medium, and an apparatus are provided. The apparatus is a BMC. The BMC load a data section, from a firmware image into a first memory, containing a first boot program and encrypted with a first private key of a first public key/private key pair. The BMC obtains a first public key, of the first public key/private key pair, that is embedded in a hardware component of the BMC. The BMC validates the data section containing the first boot program based on the first public key.

14 Claims, 4 Drawing Sheets

300

200

106

S-Boot 212

U-Boot 214

NVRAM 216

Kernel 218

Rootfs 220

Applications 222

●●●

Platform Specific Data 224

BMC BASED HROT IMPLEMENTATION ESTABLISHING CHAIN OF TRUST IN A SECURED SERVER SYSTEM

BACKGROUND

Field

The present disclosure relates generally to computer systems, and more particularly, to techniques of validating firmware image based on hardware root of trust (HROT) during a booting process at a baseboard management controller (BMC).

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between system management software and the platform hardware. The BMC generally provides the "intelligence" in the IPMI architecture.

The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

Not all host systems have the hardware capability for service processors to access storages of component devices (e.g., a Serial Peripheral Interface (SPI) storages) directly or communicate with the component devices. Therefore, there is a need for a mechanism for updating firmware of the component devices conveniently.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus is a BMC. The BMC load a data section, from a firmware image into a first memory, containing a first boot program and encrypted with a first private key of a first public key/private key pair. The BMC obtains a first public key, of the first public key/private key pair, that is embedded in a hardware component of the BMC. The BMC validates the data section containing the first boot program based on the first public key.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
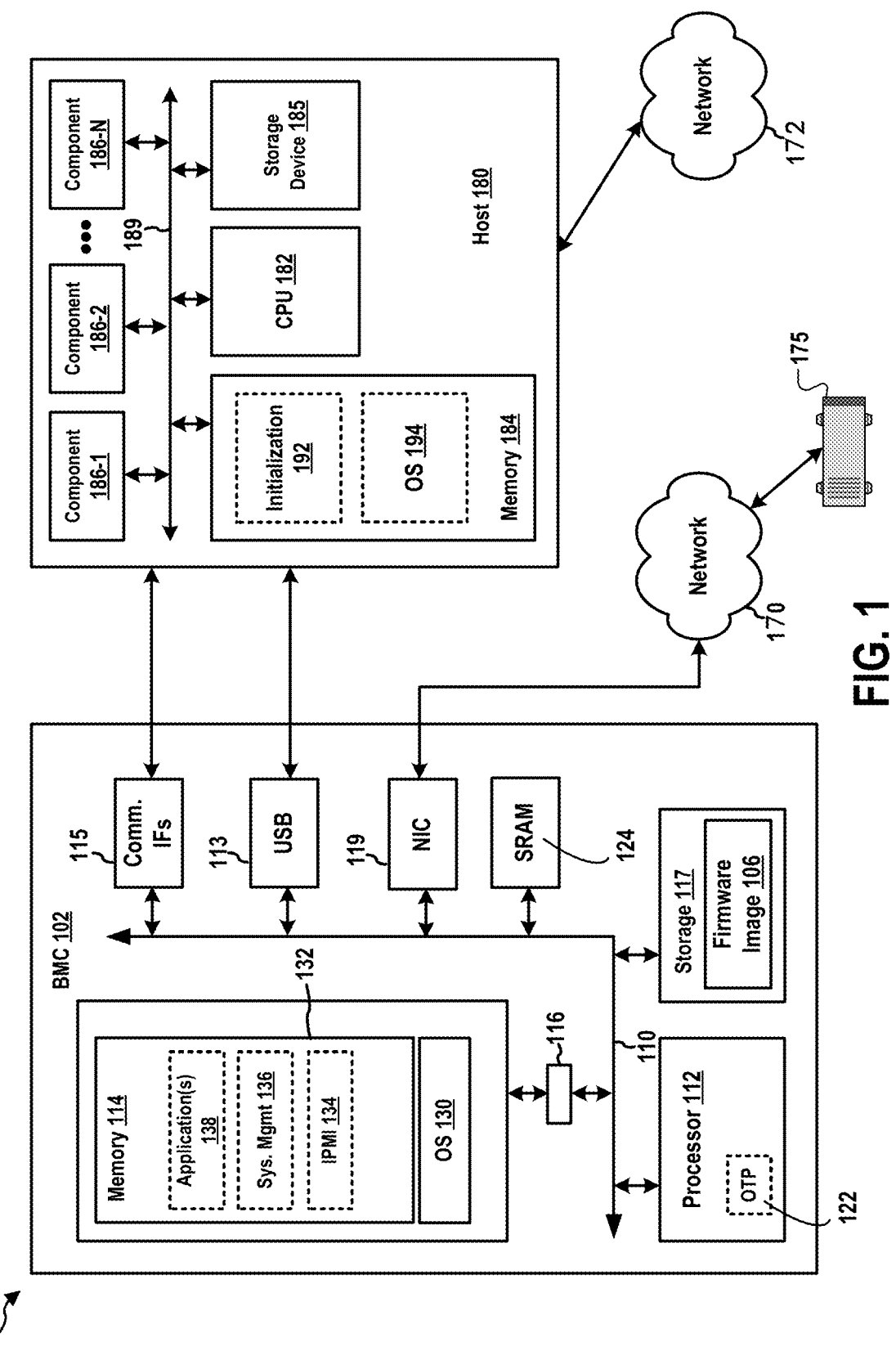
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating a computer system 100. In this example, the computer system includes, among other devices, a baseboard management controller (BMC) 102 and a host computer 180. The BMC 102 has, among other components, a processing unit 112, a memory 114(e.g., a dynamic random access memory (DRAM)), a memory driver 116, a storage 117, a network interface card 119, a USB interface 113(i.e., Universal Serial Bus), other communication interfaces 115, and a SRAM 124 (i.e., static RAM). Further, the processing unit 112 contains an OTP memory 122(i.e., one time programmable memory).

The communication interfaces 115 may include a keyboard controller style (KCS), a server management interface chip (SMIC), a block transfer (BT) interface, a system management bus system interface (SSIF), and/or other suitable communication interface(s). Further, as described infra, the BMC 102 supports IPMI and provides an IPMI interface between the BMC 102 and the host computer 180. The IPMI interface may be implemented over one or more of the USB interface 113, the network interface card 119, and the communication interfaces 115.

In certain configurations, one or more of the above components may be implemented as a system-on-a-chip (SoC). For examples, the processing unit 112, the memory 114, the memory driver 116, the storage 117, the network interface card 119, the USB interface 113, and/or the communication interfaces 115 may be on the same chip. In addition, the memory 114, the processing unit 112, the memory driver 116, the storage 117, the communication interfaces 115, and/or the network interface card 119 may be in communication with each other through a communication channel 110 such as a bus architecture.

The BMC 102 may store BMC firmware image 106 in the storage 117. The storage 117 may utilize one or more non-volatile, non-transitory storage media. During a boot-up, the processing unit 112 loads code and data of the BMC firmware image 106 into the memory 114. In particular, the BMC firmware image 106 can provide in the memory 114 an OS 130(i.e., operating system) and service components 132. The service components 132 include, among other components, IPMI services 134, a system management component 136, and application(s) 138. Further, the service components 132 may be implemented as a service stack. As such, the BMC firmware image 106 can provide an embedded system to the BMC 102.

The BMC 102 may be in communication with the host computer 180 through the USB interface 113, the network interface card 119, the communication interfaces 115, and/or the IPMI interface, etc.

The host computer 180 includes a host CPU 182, a host memory 184, a storage device 185, and component devices 186-1 to 186-N. The component devices 186-1 to 186-N can be any suitable type of hardware components that are installed on the host computer 180, including additional CPUs, memories, and storage devices. As a further example, the component devices 186-1 to 186-N can also include Peripheral Component Interconnect Express (PCIe) devices, a redundant array of independent disks (RAID) controller, and/or a network controller. Further, the component devices 186-1 to 186-N can include hardware components of a computer 402 shown in FIG. 4.

After the host computer 180 is powered on, the host CPU 182 loads an initialization component 192 from the storage device 185 into the host memory 184 and executes the initialization component 192. In one example, the initialization component 192 is a basic input/output system (BIOS). In another example, the initialization component 192 implements a Unified Extensible Firmware Interface (UEFI). UEFI is defined in, for example, "Unified Extensible Firmware Interface Specification Version 2.6, dated January, 2016," whichis expressly incorporated by reference herein in their entirety. As such, the initialization component 192 may include one or more UEFI boot services.

The initialization component 192, among other things, performs hardware initialization during the booting process (power-on startup). For example, when the initialization component 192 is a BIOS, the initialization component 192 can perform a Power On System Test, or Power On Self Test, (POST). The POST is used to initialize the standard system components, such as system timers, system DMA (Direct Memory Access) controllers, system memory controllers, system I/O devices and video hardware (which are part of the component devices 186-1 to 186-N). As part of its initialization routine, the POST sets the default values for a table of interrupt vectors. These default values point to standard interrupt handlers in the memory 114 or a ROM. The POST also performs a reliability test to check that the system hardware, such as the memory and system timers, is functioning correctly. After system initialization and diagnostics, the POST surveys the system for firmware located on non-volatile memory on optional hardware cards (adapters) in the system. This is performed by scanning a specific address space for memory having a given signature. If the signature is found, the initialization component 192 then initializes the device on which it is located. When the initialization component 192 includes UEFI boot services, the initialization component 192 may also perform procedures similar to POST.

After the hardware initialization is performed, the initialization component 192 can read a bootstrap loader from a predetermined location from a boot device of the storage device 185, usually a hard disk of the storage device 185, into the host memory 184, and passes control to the bootstrap loader. The bootstrap loader then loads an OS 194 into the host memory 184. If the OS 194 is properly loaded into memory, the bootstrap loader passes control to it. Subsequently, the OS 194 initializes and operates. Further, on certain disk-less, or media-less, workstations, the adapter firmware located on a network interface card re-routes the pointers used to bootstrap the operating system to download the operating system from an attached network.

The service components 132 of the BMC 102 may manage the host computer 180 and is responsible for managing and monitoring the server vitals such as temperature and voltage levels. The service stack can also facilitate administrators to remotely access and manage the host computer 180. In particular, the BMC 102, via the IPMI services 134, may manage the host computer 180 in accordance with IPMI. The service components 132 may receive and send IPMI messages to the host computer 180 through the IPMI interface.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170(e.g., a local area network (LAN)). In this example, the BMC 102 may be in communication with the communication network 170 through the network interface card 119. Further, the communication network 170 may be isolated from the data network 172 and may be out-of-band to the data network 172 and out-of-band to the host computer 180. In particular, communications of the BMC 102 through the communication network 170 do not pass through the OS 194 of the host computer 180. In certain configurations, the communication network 170 may not be connected to the Internet. In certain configurations, the communication network 170 may be in communication with the data network 172 and/or the Internet. In addition, through the communication network 170, a remote device 175 may communicate with the BMC 102. For example, the remote device 175 may send IPMI messages to the BMC 102 over the communication network 170.

Figure 2:
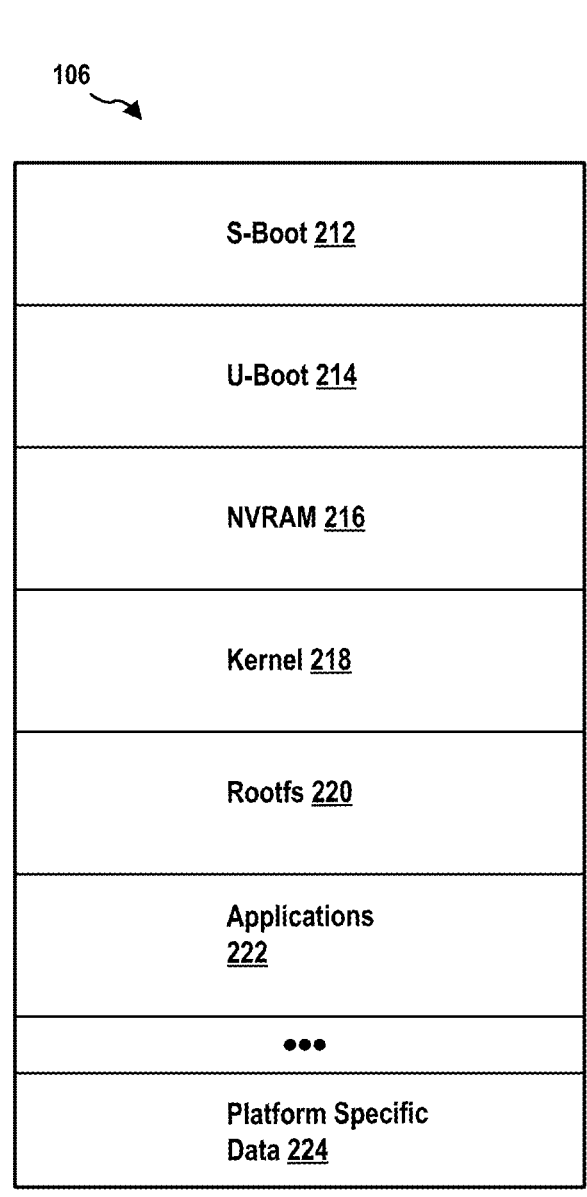
FIG. 2 is a diagram illustrating a BMC firmware image.

FIG. 2 is a diagram 200 illustrating a BMC firmware image 106. The BMC firmware image 106 contains data sections of an S-Boot 212(i.e., a first boot program), a U-Boot 214(i.e., a second boot program), a NVRAM 216 (i.e., non-volatile random-access memory), a kernel 218, a rootfs 220 (i.e., root file system), applications 222, and platform specific data 224.

Figure 3:
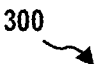
FIG. 3 is a diagram illustrating validation procedures utilized in a bootup process of the BMC.
Figure 3:
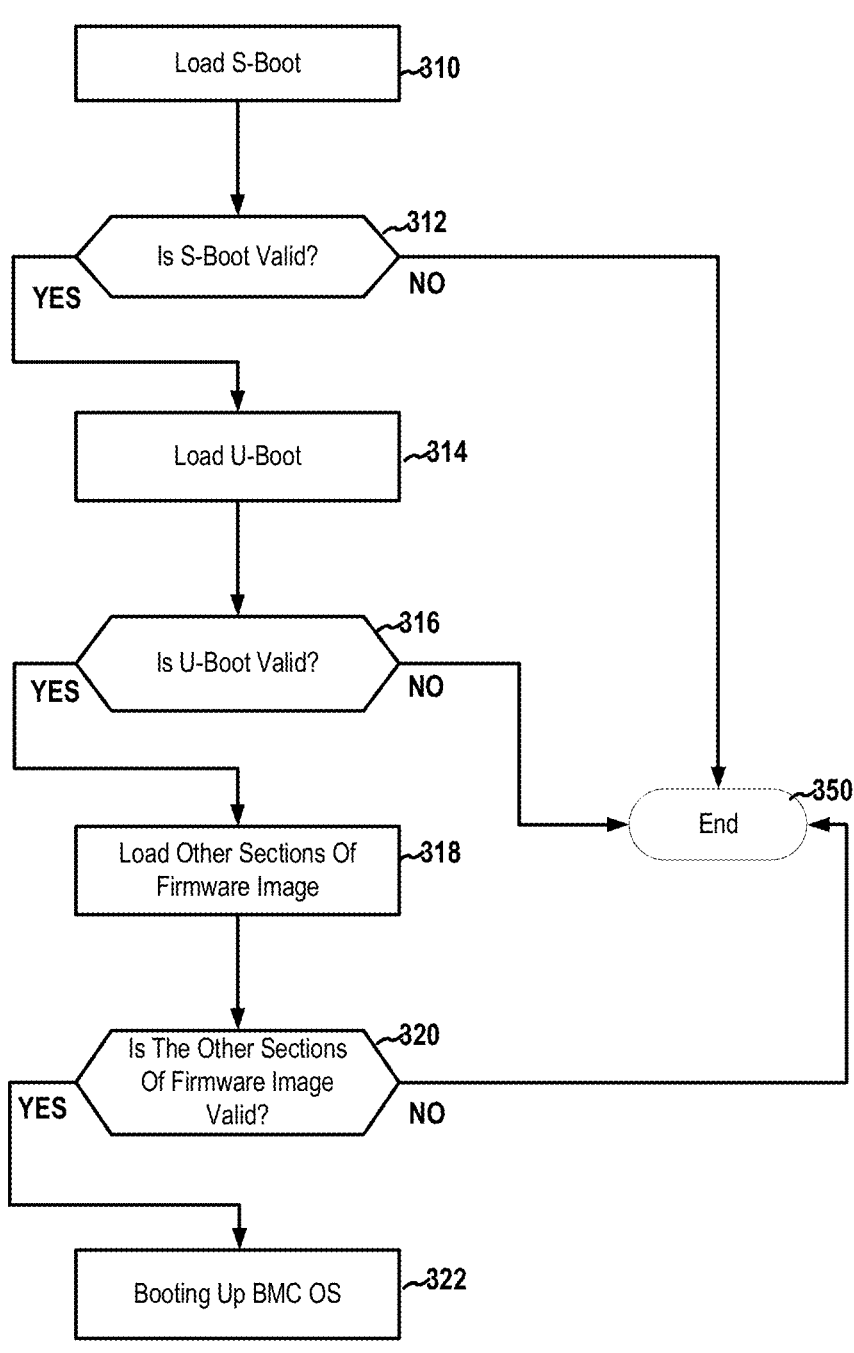

FIG. 3 is a diagram 300 illustrating validation procedures utilized in a bootup process of the BMC 102. After the BMC 102 is powered on or reset, the BMC 102 enters a booting process. In procedure 310, the processing unit 112 loads, from the storage 117, the data section of the BMC firmware image 106 containing the S-Boot 212 (e.g., the initial 64 KB) into the SRAM 124. The data of this section are encrypted with the private key A of a first public key/private key pair.

In procedure 312, the processing unit 112 validates the data section of the S-Boot 212. In particular, the OTP memory 122 of the processing unit 112 is programmed with the public key A of the first public key/private key pair. The processing unit 112 retrieves the public key A from the OTP memory 122, and uses the public key A to decrypt the data section of the S-Boot 212. As such, the decrypted data of the S-Boot 212 are stored in the SRAM 124. Further, in certain configurations, the processing unit 112 may calculate a hash for the decrypted data of the S-Boot 212 and extract another hash stored in the decrypted data. The processing unit 112 then compares the calculated hash and the stored hash to determine if the S-Boot 212 is valid.

When the data section containing the S-Boot 212 is not valid, the processing unit 112 enters procedure 350, in which the booting process is ended. When data of the S-Boot 212 is valid, the processing unit 112 executes the S-Boot 212.

The S-Boot 212 initializes the memory 114(e.g., a DRAM). Subsequently, in procedure 314, the S-Boot 212 loads the data section of the BMC firmware image 106 containing the U-Boot 214 into the memory 114. In procedure 316, the S-Boot 212 then validates the data of the U-Boot 214. For example, similar to what was described supra, the processing unit 112 may use hashes to validate the data section containing the U-Boot 214.

When the data section containing the U-Boot 214 is not valid, the S-Boot 212 enters procedure 350, in which the booting process is ended. When data section containing the U-Boot 214 is valid, the S-Boot 212 passes control to the U-Boot 214. That is, the processing unit 112 executes the U-Boot 214 and enters procedure 318.

In procedure 318, the U-Boot 214 then loads the remainder of the BMC firmware image 106(e.g., data sections of the NVRAM 216, the kernel 218, the rootfs 220, the applications 222, the platform specific data 224, etc.) into the memory 114. In certain configurations, the data sections of the kernel 218, the rootfs 220, the applications 222, and/or other components are encrypted by the private key B of a second public key/private key pair. Further, the platform specific data 224 contain the public key B of the second public key/private key pair.

In procedure 320, the U-Boot 214 validates those data sections of the BMC firmware image 106. In particular, the U-Boot 214 retrieves the public key B from the platform specific data 224 and uses the public key B to decrypt the data sections containing the kernel 218, the rootfs 220, the applications 222, etc. Further, similar to what was described supra, the processing unit 112 may use hashes to validate the data containing those components.

When the data sections of the kernel 218, the rootfs 220, the applications 222, and/or other components are not valid, the U-Boot 214 enters procedure 350, in which the booting process is ended. When those sections are valid, in procedure 322, the OS 130 is booted up. In particular, the U-Boot 214 passes the control to the kernel 218. The kernel 218 then initializes the rootfs 220. The kernel 218 then mounts the NVRAM 216(e.g., utilizing the SRAM 124). The NVRAM 216 may contain system configuration information, such as settings for the hardware and the BMC firmware. The applications 222(e.g., the IPMI services 134, the system management component 136, and the application(s) 138) are then started.

Figure 4:
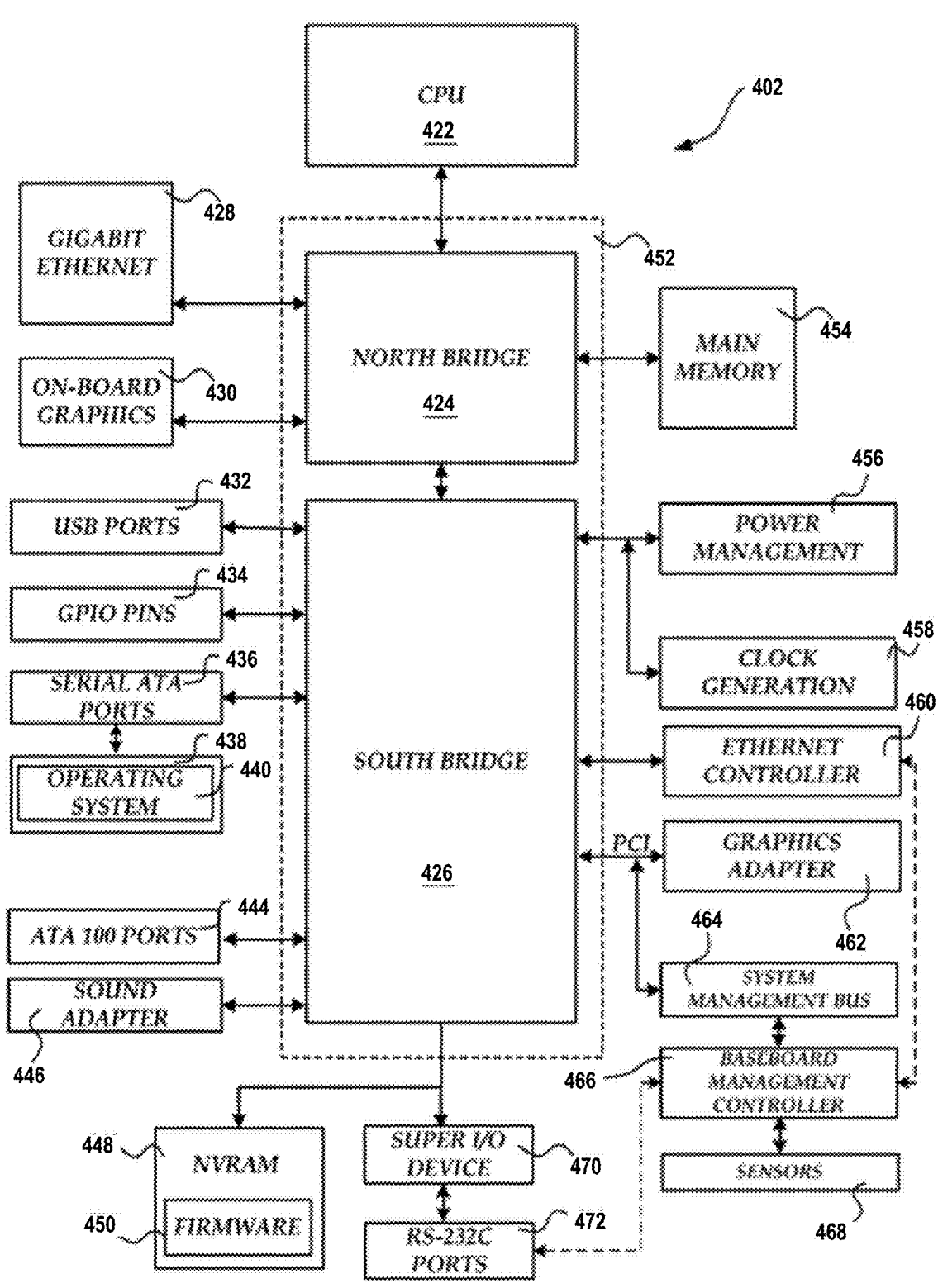
FIG. 4 shows an architecture for a computer.

FIG. 4 and the following discussion are intended to provide a brief, general description of one suitable computing environment in which aspects of the embodiments described herein may be implemented. In particular, FIG. 4 shows a computer architecture for a computer 402 that may be utilized to embody the host computer 180, as described supra. It should be appreciated that the computer architecture shown in FIG. 4 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 402 shown in FIG. 4 includes a baseboard, or "motherboard," which is a printed circuit board to which a multitude of components or devices may be connected by way of a system bus or other electrical communication path. In one illustrative embodiment, a CPU 422 operates in conjunction with a chipset 452. The CPU 422 is a standard central processor that performs arithmetic and logical operations necessary for the operation of the computer. The server computer 402 may include a multitude of CPUs 422.

The chipset 452 includes a north bridge 424 and a south bridge 426. The north bridge 424 provides an interface between the CPU 422 and the remainder of the computer 402. The north bridge 424 also provides an interface to a random access memory ("RAM") used as the main memory 454 in the computer 402 and, possibly, to an on-board graphics adapter 430. The north bridge 424 may also include functionality for providing networking functionality through a gigabit Ethernet adapter 428. The gigabit Ethernet adapter 428 is capable of connecting the computer 402 to another computer via a network. Connections which may be made by the network adapter 428 may include LAN or WAN connections. LAN and WAN networking environments are commonplace in offices, enterprise-wide computer networks, intranets, and the internet. The north bridge 424 is connected to the south bridge 426.

The south bridge 426 is responsible for controlling many of the input/output functions of the computer 402. In particular, the south bridge 426 may provide one or more USB ports 432, a sound adapter 446, an Ethernet controller 460, and one or more GPIO pins 434. The south bridge 426 may also provide a bus for interfacing peripheral card devices such as a graphics adapter 462. In one embodiment, the bus comprises a PCI bus. The south bridge 426 may also provide a system management bus 464 for use in managing the various components of the computer 402. Additional details regarding the operation of the system management bus 464 and its connected components are provided below.

The south bridge 426 is also operative to provide one or more interfaces for connecting mass storage devices to the computer 402. For instance, according to an embodiment, the south bridge 426 includes a serial advanced technology attachment ("SATA") adapter for providing one or more SATA ports 436 and an ATA 100 adapter for providing one or more ATA 100 ports 444. The SATA ports 436 and the ATA 100 ports 444 may be, in turn, connected to one or more mass storage devices such as the SATA disk drive 438 storing an operating system 440 and application programs.

As known to those skilled in the art, an operating system 440 comprises a set of programs that control operations of a computer and allocation of resources. An application program is software that runs on top of the operating system software, or other runtime environment, and uses computer resources to perform application specific tasks desired by the user. According to one embodiment of the invention, the operating system 440 comprises the LINUX operating system. According to another embodiment of the invention the operating system 440 comprises an operating system within the WINDOWS family of operating systems from MICROSOFT CORPORATION. According to another embodiment, the operating system 440 comprises the UNIX, LINUX, or SOLARIS operating system. It should be appreciated that other operating systems may also be utilized.

The mass storage devices connected to the south bridge 426, and their associated computer storage media, provide non-volatile storage for the computer 402. Although the description of computer storage media contained herein refers to a mass storage device, such as a hard disk or CD-ROM drive, it should be appreciated by those skilled in the art that computer storage media can be any available media that can be accessed by the computer 402.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 426 for connecting a "Super I/O" device 470. The Super I/O device 470 is responsible for providing a number of input/output ports, including a keyboard port, a mouse port, a serial interface 472, a parallel port, and other types of input/output ports. The LPC interface may also connect a computer storage media such as a ROM or a flash memory such as a NVRAM 448 for storing the firmware 450 that includes program code containing the basic routines that help to start up the computer 402 and to transfer information between elements within the computer 402.

As described briefly above, the south bridge 426 may include a system management bus 464. The system management bus 464 may include a BMC 466. The BMC 466 may be the BMC 102. In general, the BMC 466 is a microcontroller that monitors operation of the computer system 402. In a more specific embodiment, the BMC 466 monitors health-related aspects associated with the computer system 402, such as, but not limited to, the temperature of one or more components of the computer system 402, speed of rotational components (e.g., spindle motor, CPU Fan, etc.) within the system, the voltage across or applied to one or more components within the system 402, and the available or used capacity of memory devices within the system 402. To accomplish these monitoring functions, the BMC 466 is communicatively connected to one or more components by way of the management bus 464. In an embodiment, these components include sensor devices 468 for measuring various operating and performance-related parameters within the computer system 402. The sensor devices 468 may be either hardware or software based components configured or programmed to measure or detect one or more of the various operating and performance-related parameters.

It should also be appreciated that the computer 402 may comprise other types of computing devices, including hand-held computers, embedded computer systems, personal digital assistants, and other types of computing devices known to those skilled in the art. It is also contemplated that the computer 402 may not include all of the components shown in FIG. 4, may include other components that are not explicitly shown in FIG. 4, or may utilize an architecture completely different than that shown in FIG. 4.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a baseboard management controller (BMC), comprising:

loading a data section, from a firmware image into a first memory, containing a first boot program and encrypted with a first private key of a first public key/private key pair;

obtaining a first public key, of the first public key/private key pair, that is embedded in a hardware component of the BMC, wherein the hardware component is a one-time programmable (OTP) memory of a processing unit of the BMC;

validating the data section containing the first boot program based on the first public key by decrypting the data section using the first public key to obtain the first boot program and comparing a calculated hash of the decrypted data section to a stored hash in the decrypted data section;

when the data section containing the first boot program is valid, executing the first boot program, wherein the first boot program is configured to:

load a data section, from the firmware image, containing a second boot program; and validate the data section containing the second boot program;

when the data section containing the second boot program is valid, executing the second boot program, wherein the second boot program is configured to:

load one or more data sections, from the firmware image and into a second memory, containing components of an operating system (OS) and encrypted with a second private key of a second public key/private key pair;

load a platform specific data section, from the firmware image into the second memory, wherein the platform specific data section is distinct from and separate from the data section containing the second boot program;

obtain a second public key, of the second public key/private key pair, from the loaded platform specific data section; and validate the one or more data sections based on the second public key by decrypting the one or more data sections using the second public key to obtain the components of the OS and comparing calculated hashes of the decrypted one or more data sections to stored hashes in the decrypted one or more data sections.

2. The method of claim 1, wherein the first memory is a static memory.

3. The method of claim 1, further comprising:

when the one or more data sections are valid, executing the OS.

4. The method of claim 1, wherein the data section containing the second boot program and the one or more data sections are loaded into the second memory that is a dynamic memory.

5. The method of claim 1, further comprising:

when any data section containing the first boot program, the second boot program, or the components of the OS is not valid, terminating booting.

6. An apparatus, the apparatus being a baseboard management controller (BMC), comprising:

a first memory; and at least one processor coupled to the first memory and configured to:

load a data section, from a firmware image into the first memory, containing a first boot program and encrypted with a first private key of a first public key/private key pair;

obtain a first public key, of the first public key/private key pair, that is embedded in a hardware component of the BMC, wherein the hardware component is a one-time programmable (OTP) memory of a processing unit of the BMC;

validate the data section containing the first boot program based on the first public key by decrypting the data section using the first public key to obtain the first boot program and comparing a calculated hash of the decrypted data section to a stored hash in the decrypted data section;

when the data section containing the first boot program is valid, execute the first boot program, wherein the first boot program is configured to:

load a data section, from the firmware image, containing a second boot program; and validate the data section containing the second boot program;

when the data section containing the second boot program is valid, execute the second boot program, wherein the second boot program is configured to:

load one or more data sections, from the firmware image and into a second memory, containing components of an operating system (OS) and encrypted with a second private key of a second public key/private key pair;

load a platform specific data section, from the firmware image into the second memory, wherein the platform specific data section is distinct from and separate from the data section containing the second boot program;

obtain a second public key, of the second public key/private key pair, from the loaded platform specific data section; and validate the one or more data sections based on the second public key by decrypting the one or more data sections using the second public key to obtain the components of the OS and comparing calculated hashes of the decrypted one or more data sections to stored hashes in the decrypted one or more data sections.

7. The apparatus of claim 6, wherein the first memory is a static memory.

8. The apparatus of claim 6, wherein the at least one processor is further configured to:

when the one or more data sections are valid, execute the OS.

9. The apparatus of claim 6, wherein the data section containing the second boot program and the one or more data sections are loaded into the second memory that is a dynamic memory.

10. The apparatus of claim 6, wherein the at least one processor is further configured to:

when any data section containing the first boot program, the second boot program, or the components of the OS is not valid, terminate booting.

11. A non-transitory computer-readable medium storing computer executable code for operating a baseboard management controller (BMC), comprising code to:

load a data section, from a firmware image into a first memory, containing a first boot program and encrypted with a first private key of a first public key/private key pair;

obtain a first public key, of the first public key/private key pair, that is embedded in a hardware component of the BMC, wherein the hardware component is a one-time programmable (OTP) memory of a processing unit of the BMC;

validate the data section containing the first boot program based on the first public key by decrypting the data section using the first public key to obtain the first boot program and comparing a calculated hash of the decrypted data section to a stored hash in the decrypted data section;

when the data section containing the first boot program is valid, execute the first boot program, wherein the first boot program is configured to:

load a data section, from the firmware image, containing a second boot program; and validate the data section containing the second boot program;

when the data section containing the second boot program is valid, execute the second boot program, wherein the second boot program is configured to:

load one or more data sections, from the firmware image and into a second memory, containing components of an operating system (OS) and encrypted with a second private key of a second public key/private key pair;

load a platform specific data section, from the firmware image into the second memory, wherein the platform specific data section is distinct from and separate from the data section containing the second boot program;

obtain a second public key, of the second public key/private key pair, from the loaded platform specific data section; and validate the one or more data sections based on the second public key by decrypting the one or more data sections using the second public key to obtain the components of the OS and comparing calculated hashes of the decrypted one or more data sections to stored hashes in the decrypted one or more data sections.

12. The non-transitory computer-readable medium of claim 11, wherein the first memory is a static memory.

13. The non-transitory computer-readable medium of claim 11, wherein the code is further configured to:

when the one or more data sections are valid, execute the OS.

14. The non-transitory computer-readable medium of claim 11, wherein the data section containing the second boot program and the one or more data sections are loaded into the second memory that is a dynamic memory.

* * * * *